(12) United States Patent
Loughnanae et al.

(10) Patent No.: US 7,652,874 B2
(45) Date of Patent: Jan. 26, 2010

(54) KEYBOARD HEIGHT ADJUSTMENT SYSTEM

(75) Inventors: James Cathal Loughnanae, Gorey (IE); Peter Sheehan, Newcastle Wicklow (IE)

(73) Assignee: Logitech Europe S.A., Romanel-Sur-Morges (CH)

( * ) Notice: Subject to any disclaimer, the term of this patent is extended or adjusted under 35 U.S.C. 154(b) by 38 days.

(21) Appl. No.: 12/001,430

(22) Filed: Dec. 11, 2007

(65) Prior Publication Data

US 2008/0144263 A1 Jun. 19, 2008

Related U.S. Application Data

(60) Provisional application No. 60/870,564, filed on Dec. 18, 2006.

(51) Int. Cl.
*G06F 1/16* (2006.01)
(52) U.S. Cl. .................... 361/679.2; 361/679.08
(58) Field of Classification Search .. 361/679.08–679.2
See application file for complete search history.

(56) References Cited

U.S. PATENT DOCUMENTS

| | | | |
|---|---|---|---|
| 4,483,634 A | | 11/1984 | Frey et al. |
| 4,527,149 A | * | 7/1985 | Swensen ...................... 341/22 |
| 4,568,056 A | * | 2/1986 | Lewinski .................... 248/677 |
| 4,610,415 A | | 9/1986 | Miller |
| 4,658,124 A | * | 4/1987 | Bertina .................... 235/145 R |
| 4,693,444 A | * | 9/1987 | Williams et al. ............ 248/653 |
| 4,735,394 A | * | 4/1988 | Facco ........................ 248/653 |
| 4,856,748 A | * | 8/1989 | Obermeyer ................. 248/688 |
| 4,951,241 A | * | 8/1990 | Hosoi et al. ............ 361/679.09 |
| 4,958,889 A | * | 9/1990 | Boyle et al. ............ 361/679.41 |
| 4,980,676 A | * | 12/1990 | Nomura et al. .......... 361/679.2 |
| 5,017,030 A | | 5/1991 | Crews |
| 5,073,050 A | | 12/1991 | Andrews |
| 5,107,402 A | * | 4/1992 | Malgouires ............ 361/679.17 |
| 5,111,361 A | * | 5/1992 | Kobayashi ............. 361/679.44 |
| 5,145,270 A | | 9/1992 | Darden |
| 5,360,280 A | | 11/1994 | Camacho et al. |
| 5,469,327 A | * | 11/1995 | Cheng .................... 361/679.55 |
| 5,553,953 A | | 9/1996 | Herman et al. |
| 5,582,386 A | * | 12/1996 | Stauffer et al. .............. 248/664 |
| 5,818,688 A | * | 10/1998 | Gluskoter et al. ....... 361/679.09 |
| 5,818,690 A | * | 10/1998 | Spencer ................. 361/679.09 |
| 5,826,992 A | | 10/1998 | Camacho et al. |
| 6,042,282 A | | 3/2000 | Camacho et al. |
| 6,097,595 A | * | 8/2000 | Cipolla .................. 361/679.21 |
| 6,443,643 B1 | | 9/2002 | Camacho et al. |
| 6,467,979 B2 | | 10/2002 | Camacho et al. |
| 6,654,230 B1 | * | 11/2003 | Jones et al. ............ 361/679.19 |
| 6,762,931 B2 | * | 7/2004 | Chen ..................... 361/679.11 |
| 6,839,226 B2 | * | 1/2005 | Chen ...................... 361/679.2 |
| 6,840,690 B2 | | 1/2005 | Camacho et al. |
| 7,109,893 B2 | * | 9/2006 | Chen .......................... 341/22 |

\* cited by examiner

*Primary Examiner*—Lisa Lea-Edmonds
(74) *Attorney, Agent, or Firm*—Weaver Austin Villeneuve Sampson LLP

(57) ABSTRACT

Keyboards comprise mechanisms to raise a portion of the keyboard to angle the keyboard for more ergonomically efficient usage. A first embodiment includes a system of gears that rotates cylindrical feet out of the bottom of the keyboard. The gear system transforms a small amount of user input into a relatively large height extension. Another embodiment includes a plinth of the keyboard housing that rests on the table while the upper portion of the keyboard is raised or lowered to the desired height.

17 Claims, 7 Drawing Sheets

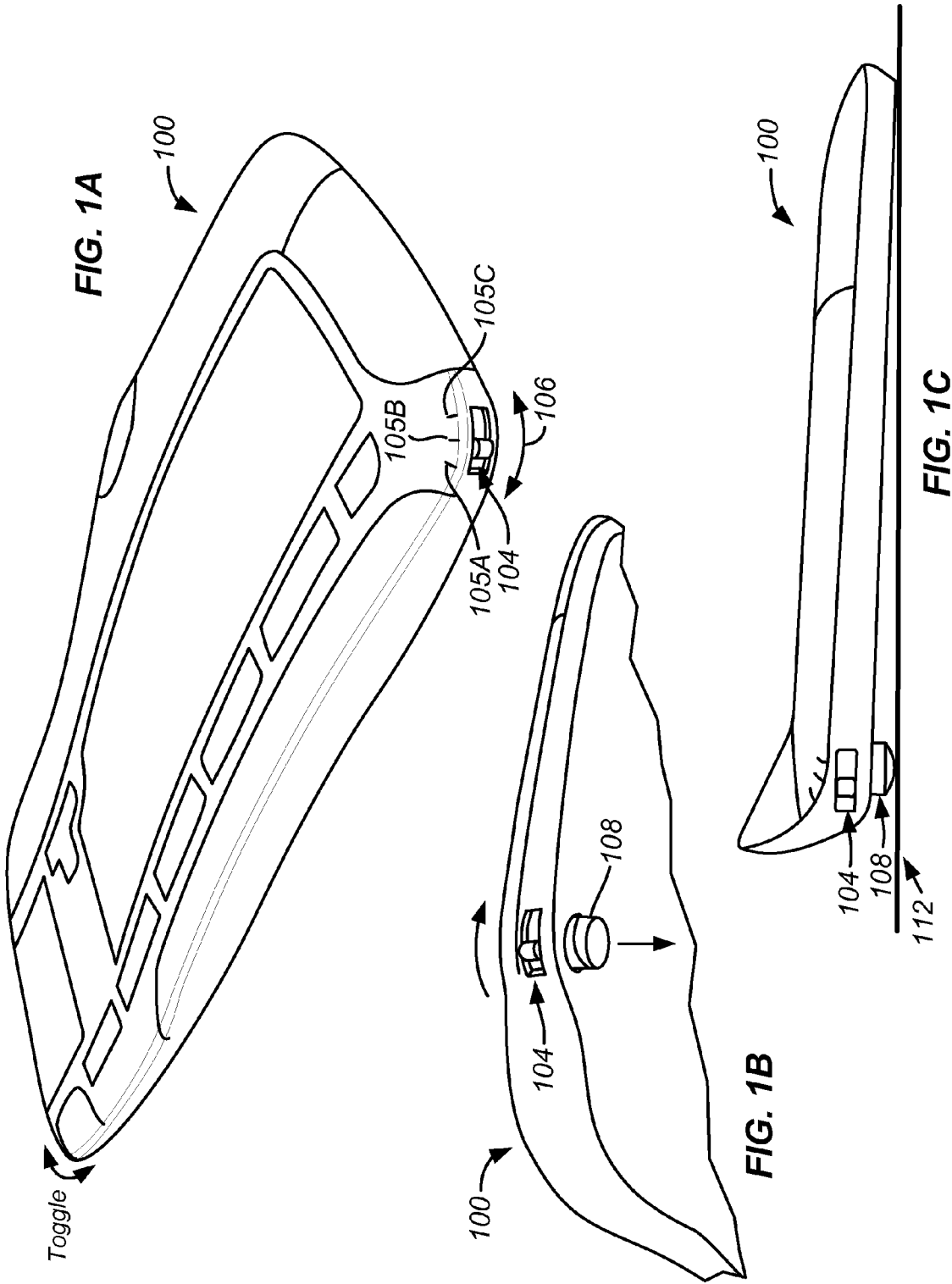

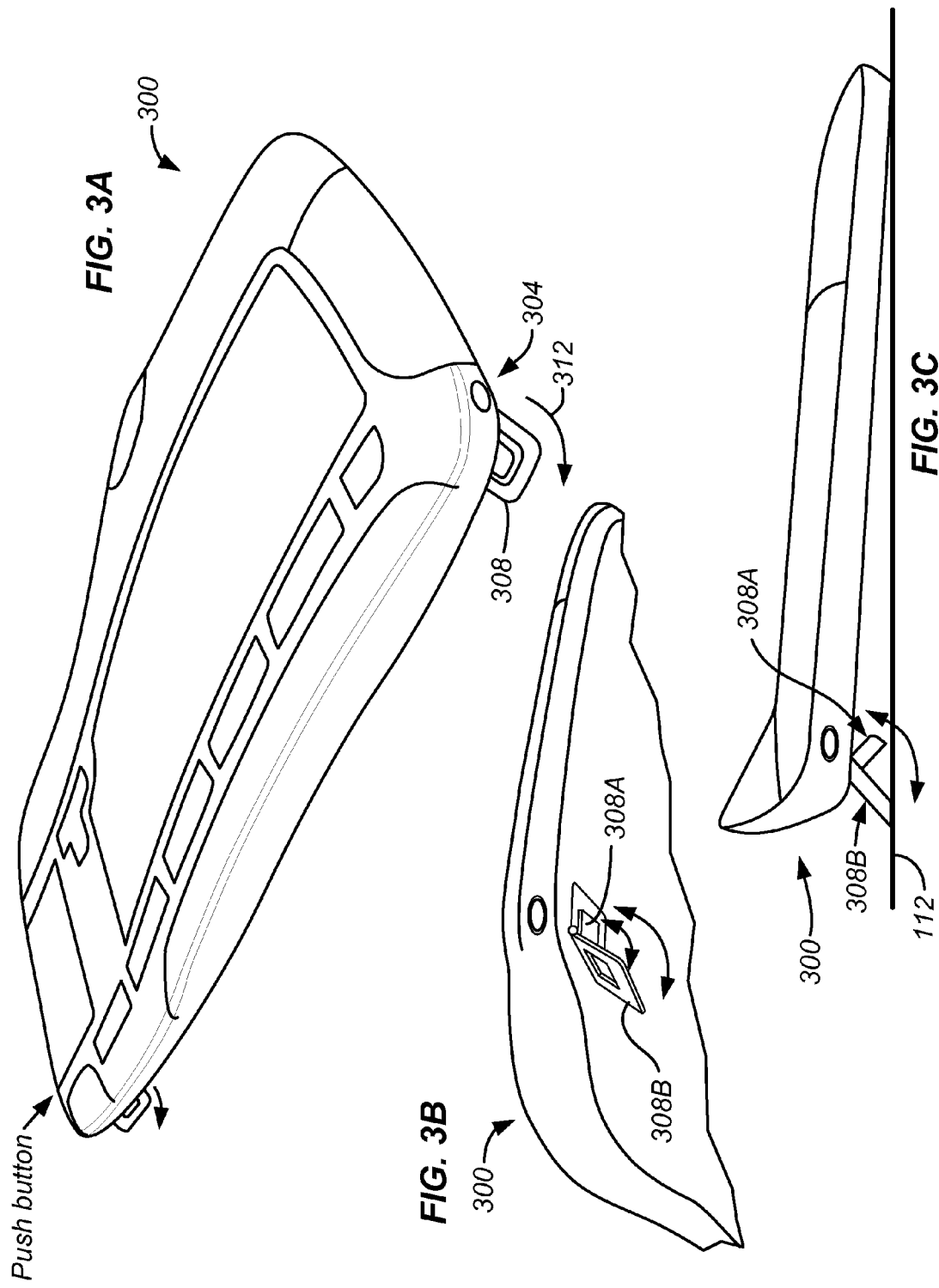

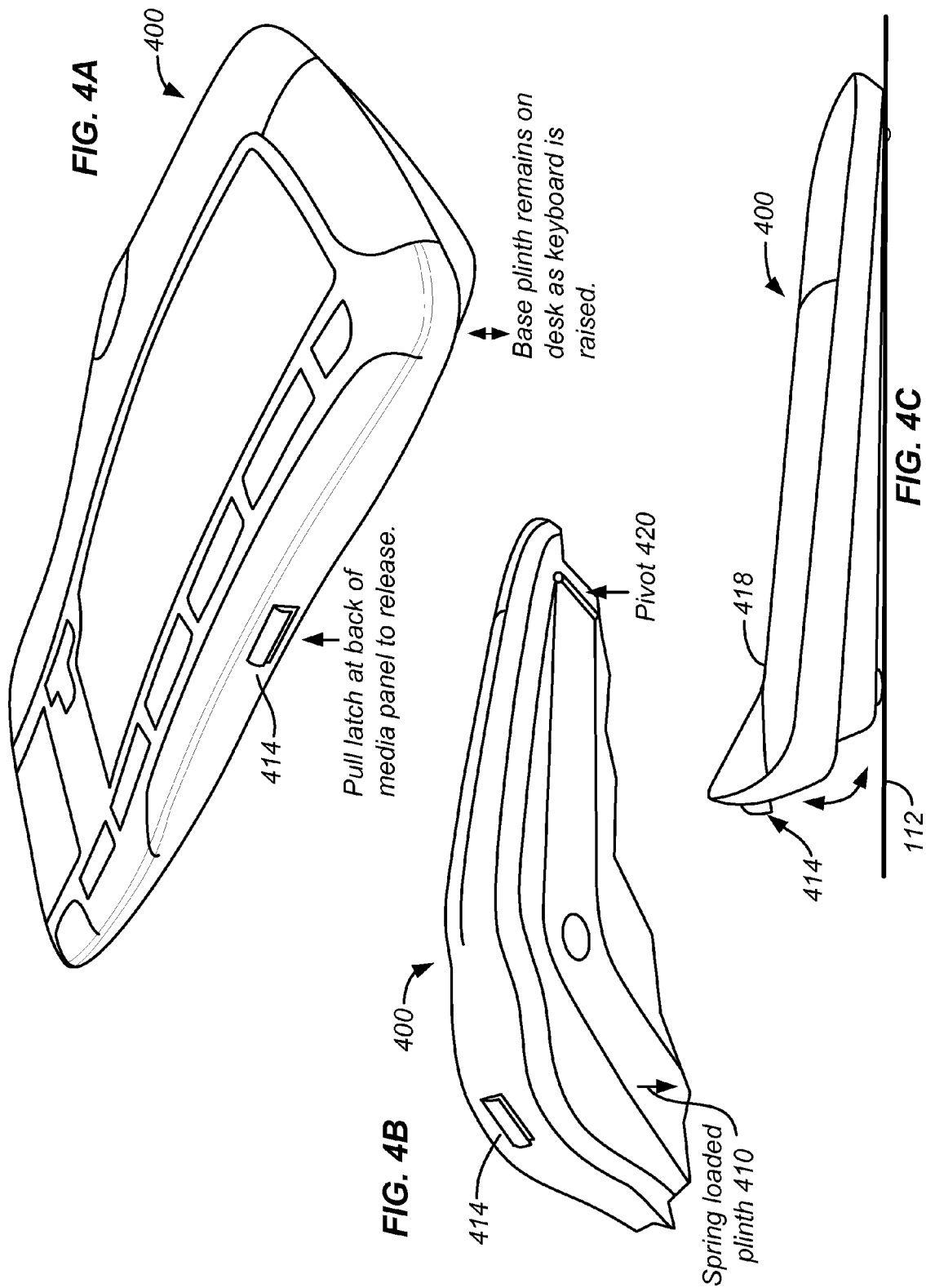

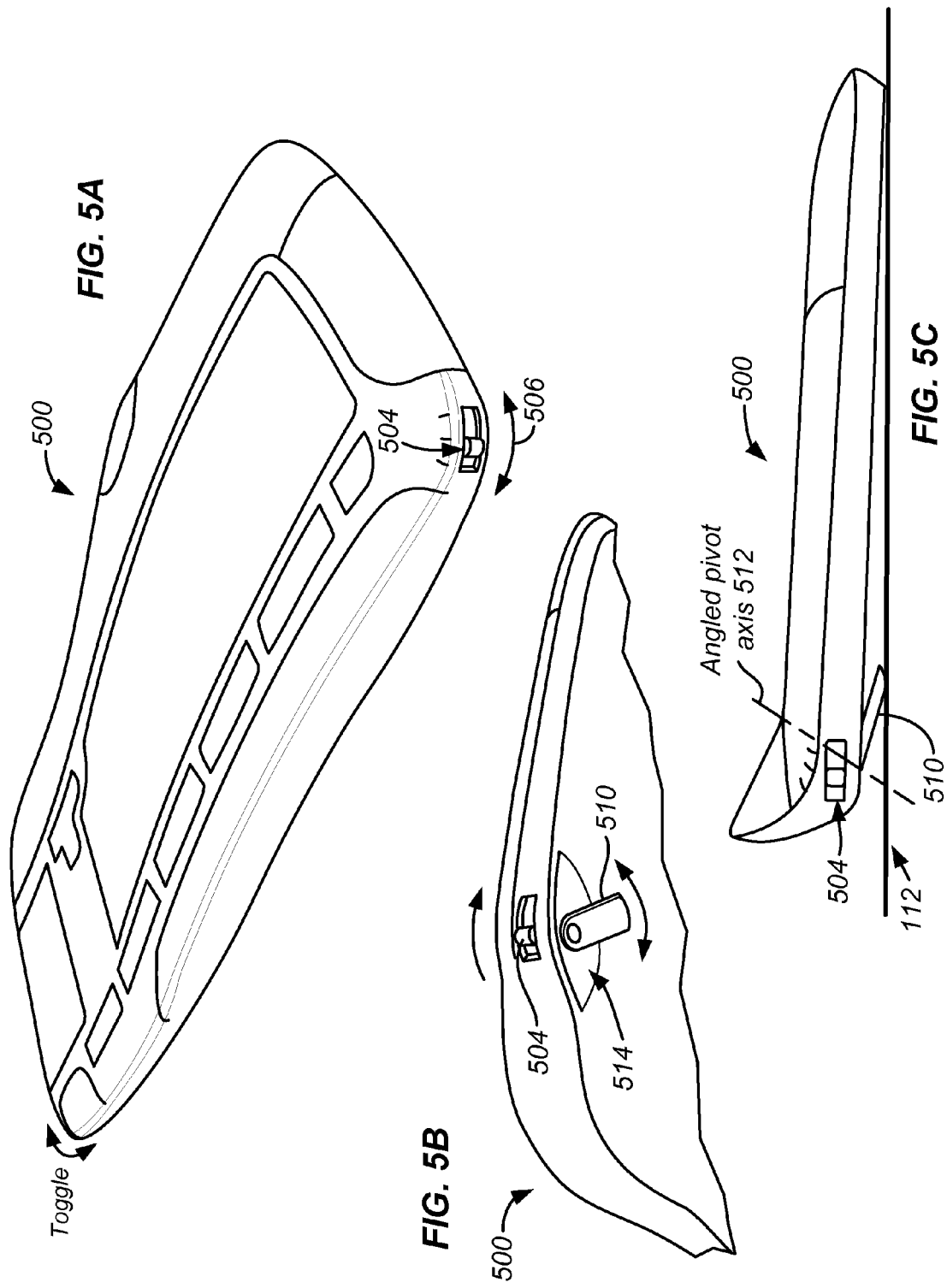

KEYBOARD HEIGHT ADJUSTMENT SYSTEM

CROSS REFERENCE TO RELATED APPLICATION

This application claims the benefit of U.S. Provisional Application No. 60/870,564 filed Dec. 18, 2006 and is incorporated in its entirety by reference as if fully set forth herein.

FIELD OF THE INVENTION

The present application is related to keyboards and adjustment of the height and angle of the keyboards.

BACKGROUND OF THE INVENTION

Fatigue and other problems such as carpal tunnel are associated with extended usage of a computer keyboards. Ergonomic keyboard design minimizes such problems.

BRIEF DESCRIPTION OF THE DRAWINGS

FIGS. 1A, 1B, and 1C are different views of keyboard 100.
FIGS. 3A, 3B, and 3C are different view of keyboard 300.
FIGS. 4A, 4B, and 4C are different views of keyboard 400.
FIGS. 5A, 5B, and 5C are different views of keyboard 500.

DETAILED DESCRIPTION OF THE PREFERRED EMBODIMENTS

Figure 2A:
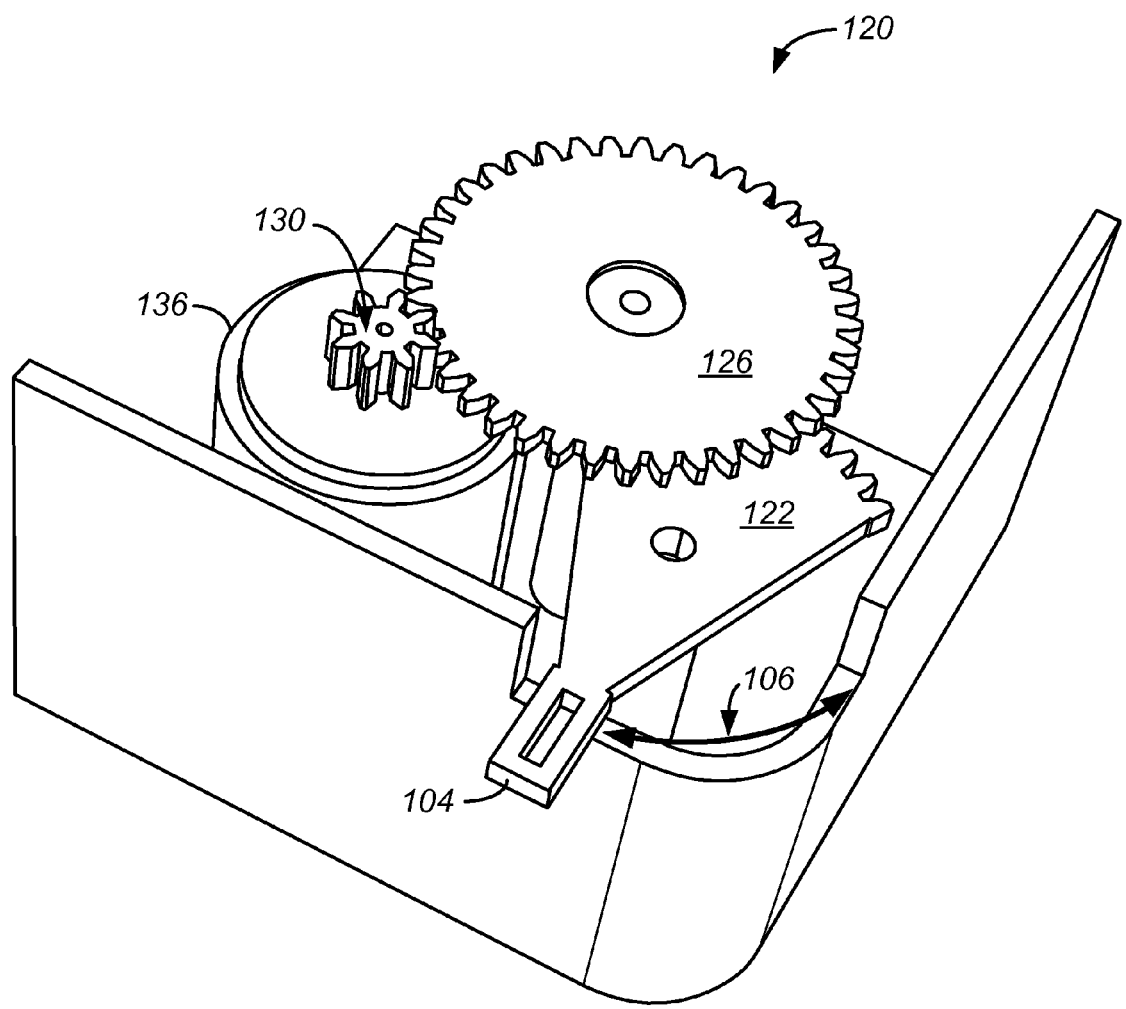
FIGS. 2A, 2B, and 2C are perspective illustrations of foot extension system 120 of keyboard 100.

FIGS. 1A, 1B, and 1C are different views of keyboard 100. Generally speaking, the keyboards described in the present application comprise a front portion nearest the user's body, and a rear portion, farther from the user's body. The function keys and other computer controls are often located at the rear portion, whereas the space bar is typically located at the front portion. A wrist rest is often provided as an integral or removable part of the keyboards, and if present is located at the front of the keyboard.

It is desirable to raise a portion of the keyboard relative to another portion. The majority of keyboard users appear to prefer to raise the back or rear of a keyboard, however there may be a benefit with prolonged touch typing to raise the front relative to the rear to achieve a slight 'negative angle' of the typing keys. Therefore, while the figures illustrate various embodiments of keyboards raised at the rear, the present invention encompasses raising the front of the keyboard relative to the rear as well. The techniques to raise one portion of the keyboard relative to another may be employed to raise any portion relative to another, and should not be limited to the embodiments described.

Keyboard 100 comprises a foot 108 at each of the rear corners of the keyboard that will raise the rear portion of the keyboard off of the upper surface of a desk or table 112. A user manipulable lever 104 is positioned at each of the rear corners of the keyboard and protrudes some distance from the keyboard so a user can rotate it along an arcuate path 106 and change the height of the keyboard. A plurality of discrete positions or detents 105 allow the user to position the legs and keyboard at various pre-selected heights. Positions 105A, 105B, and 105C are shown as an example, and correspond to extension distances of legs 108. For example, position 105C may correspond to a fully extended position, whereas positions 105A and 105B may correspond to a less than fully extended position. Lever 104 can be described as a toggle that is "toggled" between different height settings.

As seen in FIG. 1B, in one preferred embodiment, a small rotation of lever 104 is all that is necessary to fully extend feet 108. For example, a rotation of 90 degrees or less about an axis may fully extend feet 108. The amount of rotation may of course vary, and in place of a lever, a rotating wheel may also be employed to deploy feet 108. The wheel may be accessed from the side, top, or bottom of the keyboard. The portion of foot 108 that makes contact with desk 112 is preferably domed or otherwise tapered away from the center in order to ensure contact of all of the feet with the desk at all times. Foot 108 preferably comprises a rubber tip to maintain contact with the surface and to avoid scratching the work surface.

Figure 2B:
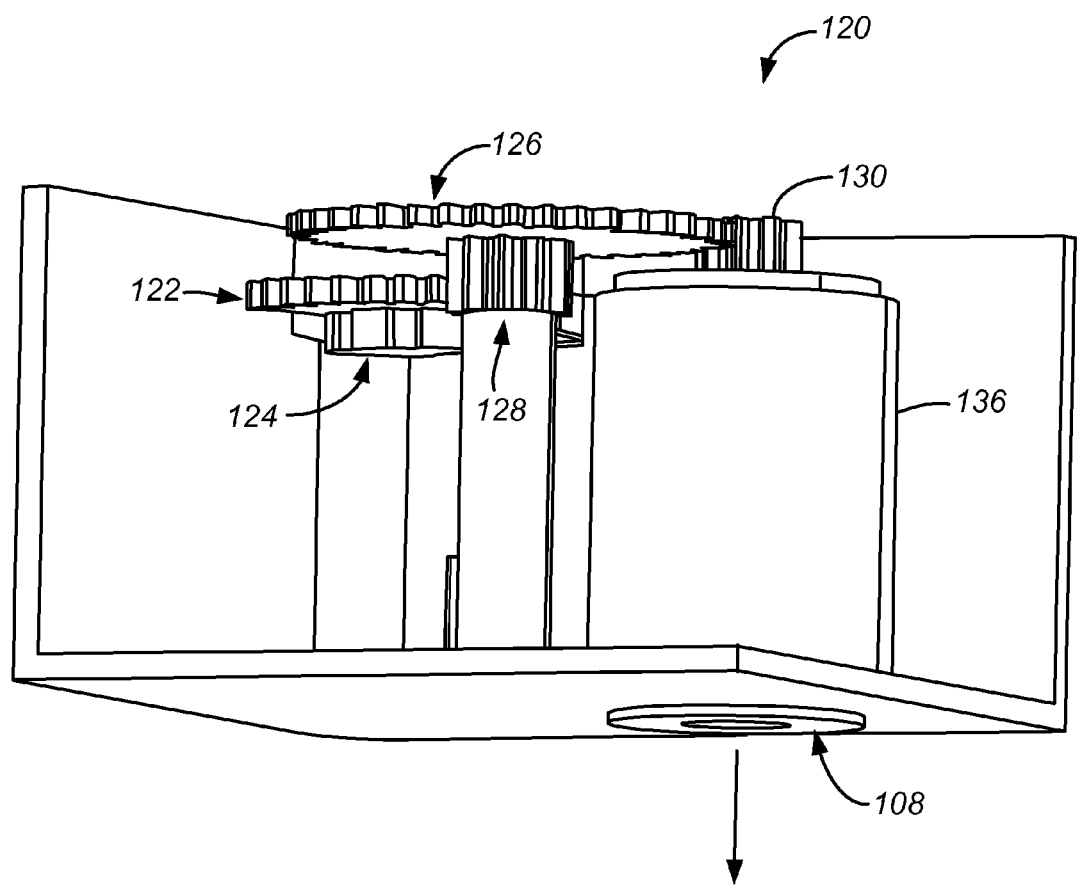
Figure 2C:
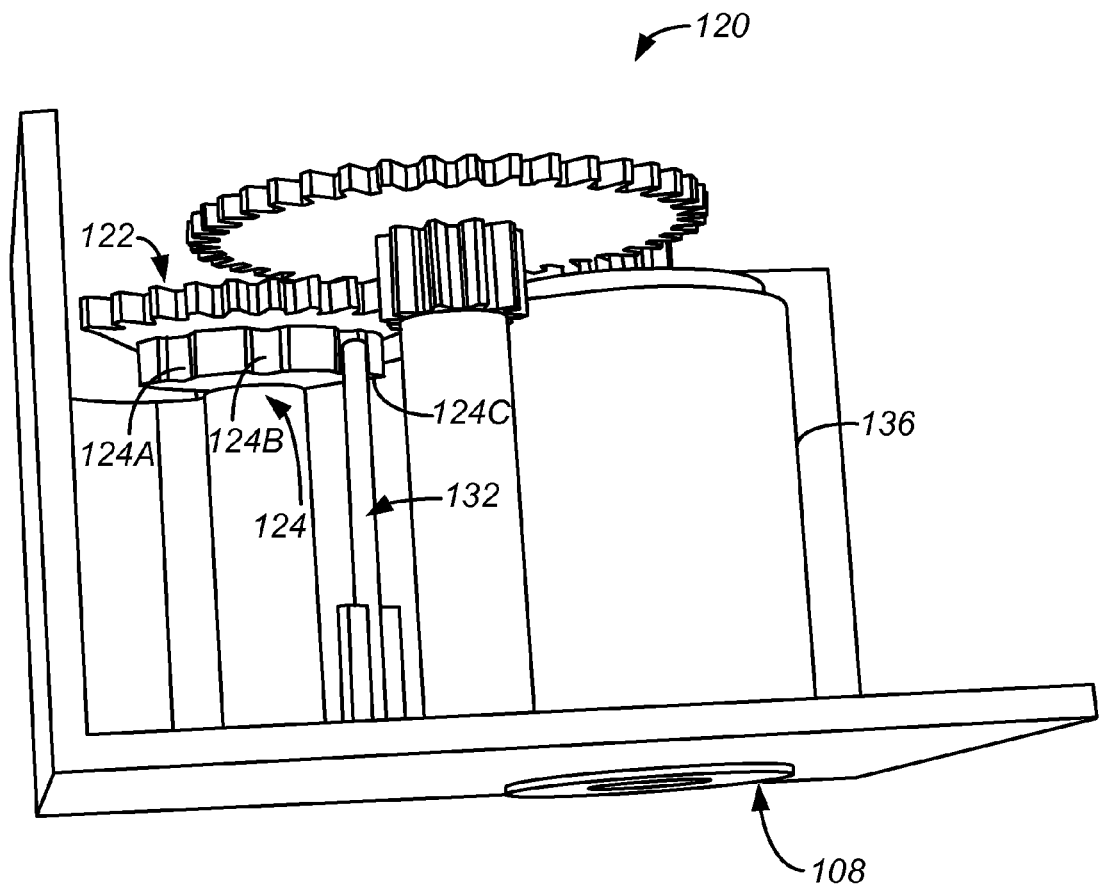
Figure 2D:
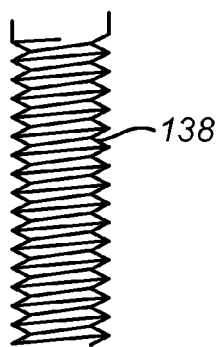
FIG. 2D is a plan view of a member of foot extension system 120.

FIGS. 2A, 2B, and 2C are perspective illustrations of foot extension system 120. System 120 translates a relatively small movement of lever 104 into a relatively large extension distance of feet 108. A foot extension system 120 is located within each of the rear corners of keyboard 100 described earlier. Lever 104 seen earlier is attached to or integrally formed with gear 122. Gear 122 is preferably a sector gear, the teeth of which mesh with those of driven gear 128. Driven gear 128 is driven by the rotation of lever 104 and sector gear 122, and is on the same shaft as central gear 126. Central gear 126, in turn, rotates pinion gear 130. Pinion gear 130 rotates a shaft 138 (not shown) within tube 136 of a threaded system and the rotating action of the threaded system forces feet 108 out of tubes 136. An example of a threaded shaft 138 is shown in FIG. 2D. Any male/female interlocking combination may be used to drive shaft 138 out from tube 136. For example a protrusion on tube 136 may slide within a groove within shaft 138 or vice versa, similar to the system used to force lipstick out of a lipstick case.

As best seen in FIG. 2C, toggle member 124 is located under and moves with sector gear 122. Toggle member 124 comprises a plurality of indentations 124A, B, C. etc. corresponding to the number of height settings of feet 108. As toggle member 124 rotates, flexible shaft 132 slides along the radius of the member and into the indentations 124A, B, C . . . etc. This serves to hold each lever 104 and foot 108 in place at a given height setting.

FIGS. 3A, 3B, and 3C are different views of keyboard 300. Keyboard 300 comprises spring loaded feet 308 that flip down at the push of button 304. Similar to the previously discussed keyboard there is a foot 308 at each rear corner of keyboard 300. The mechanism of the spring loaded feet is similar to that of a spring loaded flash on some single lens reflex cameras. When button 304 is pushed, feet 308 are released and the spring forces them to be deployed. When the feet 308 are pushed back against the body of keyboard 300 they latch in place. Another push of the button and they release. In certain embodiments of keyboard 300 and feet 308, each foot 308 comprises legs of different sizes. For example, 2 legs are shown in FIGS. 3A-3C, a small leg 308A and a large leg 308B. The small leg 308A will raise the rear of the keyboard less than large leg 308B. Although a different button can be employed to release each leg 308A or 308B, it is preferable that the same button 304 be capable of releasing the legs, with one push releasing the smaller of the legs and another push releasing the larger of the legs. As can be seen in the figures, leg 308A fits within leg 308B. Although there is one button 304 used for each foot 308, in other embodiments a single button could deploy both the right and left rear feet 308.

FIGS. 4A, 4B, and 4C are different views of keyboard 400. In keyboard 400, a spring loaded plinth 410 remains on the surface of desk 112 while the bulk or upper portion 418 of keyboard 400 is rotated to the required height. In order to do this a latch or button 414 is pulled or depressed in order to release the plinth and raise the rear of the keyboard relative to the front of the keyboard. In certain embodiments, keyboard 400 comprises one or more pivots 420 at the front of the keyboard, and upper portion 418 rotates about pivots 420 as it is raised to the desired height.

FIGS. 5A, 5B, and 5C are different views of keyboard 500. The rear of keyboard 500 is raised from desk 112 with legs 510 that rotate about an angled pivot axis 512. Axis 512 is angled some amount from vertical such that it is not perpendicular with the bottom of keyboard 500. While any angle less than 90 degrees relative to the base of the keyboard may be employed, the axis is preferably between 30-60 degrees from the plane of the base. When lever 504 is rotated along path 506 and toggled between positions, feet 510 rotate about axis 512 and out of pockets 514. As in keyboard 100, multiple height settings can be achieved with this system.

While the preferred embodiments have been described with regard to the aforementioned figures, it will be understood that the present invention is entitled to protection within the full scope of the appended claims. As mentioned previously, while the figures illustrate various embodiments of keyboards raised at the rear, the present invention encompasses raising the front of the keyboard relative to the rear as well. The techniques to raise one portion of the keyboard relative to another may be employed to raise any portion relative to another, and should not be limited to the embodiments described.

What is claimed is:

1. A keyboard for use on a work surface, the keyboard comprising:
   a housing having a base;
   one or more feet; and
   a system of gears that extends the one or more feet in a direction substantially perpendicular to the base, and raises a rear portion of the keyboard up and away from the surface such that the base of the housing at the rear portion of the keyboard is not in contact with the surface.

2. The keyboard of claim 1 further comprising a lever that drives the system of gears to alter the distance between the base of the housing at the rear portion and the surface.

3. The keyboard of claim 2 wherein the keyboard has 2 or more discrete selections for the distance between the base of the housing at the rear portion and the surface.

4. The keyboard of claim 3 wherein for each discrete selection there is a discrete position for the lever.

5. The keyboard of claim 4, wherein the discrete position is maintained by a flexible member positioned within a recess of a rotating gear of the system.

6. The keyboard of claim 1, wherein the system of gears comprises a pinion that rotates a threaded member and extends at least one of the one or more feet.

7. A keyboard having a front and a rear, the keyboard for use on a work surface and comprising:
   an upper housing, the upper housing comprising openings where keys of the keyboard are located; and
   a lower housing comprising a plinth, the plinth rotatable about a pivot at or near the front of the keyboard,
   wherein a rear portion of the plinth is extended out from the upper housing while the plinth rotates about the pivot in order to change the height of the rear of the keyboard.

8. The keyboard of claim 7, wherein the plinth is spring loaded.

9. The keyboard of claim 7, wherein when a user releases the upper housing from the lower housing, a spring exerts a force that drives the lower and upper housing away from each other.

10. The keyboard of claim 7, further comprising a latch, the latch operable to release the upper housing from the lower housing.

11. The keyboard of claim 10, wherein the latch is located at the rear of the keyboard, positioned in a location where a user of keyboard may disengage the latch while raising the rear of the upper housing of the keyboard relative to the work surface and the plinth, the plinth remaining on the work surface.

12. A method of raising the rear of a keyboard, the method comprising:
   depressing a button, the button releasing a foot and causing a compressed spring to decompress thereby rotating the foot about a pivot to an extended position,
   the extended position of the foot raising the rear of the keyboard relative to a front of the keyboard.

13. The method of claim 12, wherein the foot comprises 2 or more legs, and wherein raising the rear of the keyboard comprises depressing the button once to rotate a first of the legs, and depressing the button again to rotate additional of the legs, the first of the legs raising the rear of the keyboard a different height than each of the additional legs.

14. A keyboard for use on a work surface, the keyboard comprising:
   a housing having a base;
   one or more feet; and
   a system of gears that extends the one or more feet in a direction substantially perpendicular to the base, and raises a first portion of the keyboard up and away from the surface such that the base of the housing at the first portion of the keyboard is not in contact with the surface.

15. The keyboard of claim 14, wherein the first portion comprises the front of the keyboard, and the front of the keyboard is raised relative to a rear portion of the keyboard.

16. The keyboard of claim 14, wherein the first portion comprises the rear of the keyboard, and the rear of the keyboard is raised relative to a front portion of the keyboard.

17. A keyboard having a front and a rear, the keyboard for use on a work surface and comprising:
   an upper housing, the upper housing comprising openings where keys of the keyboard are located; and
   a lower housing comprising a plinth, the plinth rotatable about a pivot at or near the rear of the keyboard,
   wherein a front portion of the plinth is extended out from the upper housing while the plinth rotates about the pivot in order to change the height of the front of the keyboard.

* * * * *

UNITED STATES PATENT AND TRADEMARK OFFICE
CERTIFICATE OF CORRECTION

PATENT NO. : 7,652,874 B2  
APPLICATION NO. : 12/001430  
DATED : January 26, 2010  
INVENTOR(S) : James Cathal Loughnane and Peter Sheehan It is certified that error appears in the above-identified patent and that said Letters Patent is hereby corrected as shown below:

Title page, Item (12) below United States Patent, change "Loughnanae et al." to --Loughnane et al.--.

Title page, Item (75) Inventors, change "James Cathal Loughnanae" to --James Cathal Loughnane--.

Signed and Sealed this

Thirteenth Day of July, 2010

David J. Kappos
*Director of the United States Patent and Trademark Office*